United States Patent
Golkowski et al.

(10) Patent No.: US 11,668,223 B2
(45) Date of Patent: Jun. 6, 2023

(54) REDUCTION METHOD FOR REDUCING THE OXYGEN CONTENT IN THE CATALYTIC CONVERTER, ENGINE ARRANGEMENT AND VEHICLE

(71) Applicant: Volkswagen Aktiengesellschaft, Wolfsburg (DE)

(72) Inventors: Marc-Andre Golkowski, Garbsen (DE); Stephan Schemann, Wolfsburg (DE); Christian Arenz, Braunschweig (DE); Christopher Lueck, Berlin (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/528,800

(22) Filed: Nov. 17, 2021

(65) Prior Publication Data

US 2022/0154622 A1    May 19, 2022

(30) Foreign Application Priority Data

Nov. 17, 2020  (DE) ..................... 10 2020 214 435.4

(51) Int. Cl.
*F01N 3/36* (2006.01)
*F02D 41/40* (2006.01)

(52) U.S. Cl.
CPC .............. *F01N 3/36* (2013.01); *F02D 41/402* (2013.01); *F02D 2200/0614* (2013.01); *F02D 2200/0814* (2013.01)

(58) Field of Classification Search
CPC .......... F01N 3/36; F02D 41/40; F02D 41/401; F02D 41/402; F02D 2200/0614; F02D 2200/0814
See application file for complete search history.

(56) References Cited

U.S. PATENT DOCUMENTS

| | | | |
|---|---|---|---|
| RE46,512 E * | 8/2017 | Beckmann | F01N 3/0821 |
| 10,753,304 B2 | 8/2020 | Kuroda | |
| 10,774,769 B2 | 9/2020 | Kuroda et al. | |
| 10,851,696 B2 | 12/2020 | Wagner et al. | |
| 10,907,560 B2 | 2/2021 | Ikeda et al. | |
| 11,187,172 B2 | 11/2021 | Ikeda et al. | |
| 11,428,179 B1 * | 8/2022 | Kurtz | F02B 37/24 |

(Continued)

FOREIGN PATENT DOCUMENTS

| | | |
|---|---|---|
| DE | 102015116659 A1 | 4/2017 |
| DE | 102016219689 A1 | 4/2018 |

(Continued)

*Primary Examiner* — Hai H Huynh
*Assistant Examiner* — Johnny H Hoang
(74) *Attorney, Agent, or Firm* — Muncy, Geissler, Olds & Lowe, P.C.

(57) ABSTRACT

A reduction method for a catalytic converter in an exhaust system of an internal combustion engine for reducing the oxygen content in the catalytic converter, in particular after an overrun fuel cutoff mode of the internal combustion engine, the method including first injection of fuel into a first cylinder, the first injection taking place after an ignition point in time of a compression stroke of a first working cycle of the cylinder and including an introduction of the injected fuel from the cylinder into the catalytic converter during an exhaust stroke of the first cylinder.

10 Claims, 8 Drawing Sheets

(56) References Cited

U.S. PATENT DOCUMENTS

| | | | |
|---|---|---|---|
| 2006/0207566 A1* | 9/2006 | Kobayashi | F02D 41/30 123/696 |
| 2007/0062476 A1* | 3/2007 | Ota | F02B 23/104 123/179.4 |
| 2011/0023454 A1* | 2/2011 | Kurtz | F02D 41/029 60/274 |
| 2015/0051812 A1 | 2/2015 | Santillo et al. | |
| 2018/0100417 A1 | 4/2018 | Choung et al. | |

FOREIGN PATENT DOCUMENTS

| | | |
|---|---|---|
| DE | 102018207703 A1 | 11/2019 |
| DE | 102019120770 A1 | 2/2020 |
| DE | 102019120781 A1 | 2/2020 |
| DE | 102019120784 A1 | 2/2020 |
| WO | WO2016146907 A1 | 9/2016 |

* cited by examiner

REDUCTION METHOD FOR REDUCING THE OXYGEN CONTENT IN THE CATALYTIC CONVERTER, ENGINE ARRANGEMENT AND VEHICLE

This nonprovisional application claims priority under 35 U.S.C. § 119(a) to German Patent Application No. 10 2020 214 435.4, which was filed in Germany on Nov. 17, 2020, and which is herein incorporated by reference.

BACKGROUND OF THE INVENTION

Field of the Invention

The present invention relates to a reduction method for a catalytic converter in an exhaust system of an internal combustion engine for reducing the oxygen content in the catalytic converter, in particular after an overrun fuel cutoff mode of the internal combustion engine, an engine arrangement for carrying out the reduction method and a vehicle which comprises the engine arrangement.

Description of the Background Art

Internal combustion engines convert chemical energy into mechanical energy. For this purpose, an ignitable mixture of fuel and air is introduced into a combustion chamber (cylinder), where it is ignited. In current internal combustion engines, an engine control unit is used to control and monitor the combustion processes in the engine in such a way that the desired driving behavior is achieved and the valid exhaust standard is complied with (e.g., by means of lambda regulation). For this purpose, the engine control unit may calculate and output control signals synchronously with the in-engine process. This applies, in particular, to the air charge of the combustion chamber, the fuel injection and the control of the ignition point in time up to the regeneration/cleaning of the exhaust system. The engine control unit is often not an open control system but a closed one, since the actual state measured by a sensor is compared with a calculated setpoint state (feedback), and the deviation in the closed control loop is then minimized by an actuator.

US 2015/0051812 A1 discloses a system and a method for reducing the nitrogen oxide emissions of an internal combustion engine. US 2015/0051812 A1 furthermore indicates that no fuel is supplied to the internal combustion engine if it is established that a vehicle is in overrun. It is furthermore demonstrated that the internal combustion engine is operated with a rich air/fuel ratio when the internal combustion engine is re-ignited following braking.

DE 10 2019 12 0770 A1, which corresponds to US 2020/0049087 discloses a machine control device for an internal combustion engine. The machine control device carries out a fuel introduction process for introducing an air/fuel mixture, which contains fuel injected by a fuel injection valve. The machine control device is configured in such a way that a greater amount of fuel is injected into the cylinder, so that a portion of the air/fuel mixture within the cylinder may be conducted uncombusted to a three-way catalytic converter.

DE 10 2019 12 0781 A1, which corresponds to US 2020/0049090 discloses a controller for an internal combustion engine of the spark-ignition type. The internal combustion engine contains a fuel injection valve for injecting fuel and a three-way catalytic converter, which is provided in the outlet channel. The controller comprises an injection valve control unit. The injection valve control unit is designed to carry out an enrichment process, which controls the fuel injection valve when the combustion in the cylinder in which the combustion was stopped is resumed, so that an air/fuel ratio is set, which is richer than the stoichiometric air/fuel ratio.

The substoichiometric engine operation during the fuel feed restart of the internal combustion engine for avoiding nitrogen oxides according to the prior art may increase the raw emissions of hydrocarbons and carbon monoxide. This could result in an undesirable increase in the end pipe carbon dioxide emissions.

SUMMARY OF THE INVENTION

It is therefore an object of the present invention to provide an advantageous method for optimizing an oxygen removal from the catalytic converter, which reduces the nitrogen oxide (NOx) emissions.

A first aspect of the present invention relates to a reduction method for a catalytic converter in an exhaust system of an internal combustion engine for reducing the oxygen content in the catalytic converter, in particular after a overrun fuel cutoff mode of the internal combustion engine, comprising first injection of fuel into a first cylinder, the first injection taking place after an ignition point in time of a compression stroke of a first working cycle of the cylinder, and comprising introduction of an injected fuel from the cylinder into the catalytic converter during an exhaust stroke of the first cylinder.

In the overrun fuel cutoff mode (overrun fuel cutoff phase) of an internal combustion engine, which is used to drive a vehicle, it is not necessary to inject fuel even if an air flow is present, since the movement of the engine is maintained by the forced rotation by the drive train. When building upon idling speed, it is necessary to re-inject fuel to ensure that the engine does not stop. The overrun fuel cutoff mode is initiated if the speed of the vehicle is to be reduced, and the engine may be used as a braking effect (engine brake). During the overrun fuel cutoff phase, fresh air is supplied to the catalytic converter through the cylinder. The supplied fresh air effectuates an increase of the oxygen storage quantity in the catalytic converter. Due to the excess oxygen storage in the catalytic converter after the overrun fuel cutoff phase or a stop phase, the catalytic converter may not be able to convert nitrogen oxide (NOx) into carbon monoxide (CO) and nitrogen ($N_2$) after the recombustion of the fuel. To ensure the conversion of nitrogen oxide(s) (NOx), uncombusted hydrocarbon components (HCs) may be introduced into the catalytic converter and react with the stored oxygen before the first recombustion of the fuel takes place. A greater effect could be achieved if the fuel feed restart request is delayed by one or multiple combustion cycles (working cycles) and only a certain quantity of fuel is supplied in these cycles via injectors (fuel injectors) but is not ignited. The excess oxygen present may also be reduced by a preinjection (first injection of fuel). The preinjection (first injection) may also be used to precondition the oxygen storage surface of the catalytic converter, so that raw nitrogen oxide emissions generated during the recombustion phase in the following working cycle may be converted. By introducing the fuel into the catalytic converter prior to reach the first raw emissions may reduce the raw emissions of nitrogen oxides (NOx) or even avoid them. In other words, the emission-laden driving situations of fuel feed and engine restart may be optimized with respect to their gaseous emissions with the aid of the reduction method described here. The catalytic converter size and catalytic converter load may be reduced thereby.

The catalytic converter may be 3-way or 4-way catalytic converter with oxygen storage in the initial position. The internal combustion engine may be an SI engine. An SI engine is a combustion engine with spark ignition. An air/fuel mixture is combusted, thus releasing the chemical energy bound in the fuel and converting it into mechanical energy. The internal combustion engine carries out multiple working cycles (combustion cycles), one working cycle being able to comprise four working steps (for example, induction, compression, power and exhaust). The ignition point in time of the first working cycle of the cylinder may be a predicted point in time, no ignition of the fuel taking place at the ignition point in time of the first working cycle, In some examples, no injection of fuel contributing to the combustion of the cylinder may take place in the first working cycle.

Due to the first injection (preinjection) of fuel in the power stroke immediately after a first ignition point in time of the cylinder, a certain quantity of uncombusted fuel may be supplied to the catalytic converter. As a result, the hydrocarbon components of the fuel may react with the excess oxygen stored in the catalytic converter.

The first injection of fuel may take place in the exhaust stroke of the cylinder.

Due to the first injection (preinjection) of fuel in the exhaust stroke of the cylinder, a certain quantity of uncombusted fuel may be supplied to the catalytic converter. As a result, the hydrocarbon components (HC) of the fuel may react with the excess oxygen stored in the catalytic converter.

The reduction method may further comprise: second injection of fuel into a second cylinder, the second injection taking place before an ignition point in time of a compression stroke of a second working cycle of the second cylinder; ignition of the fuel of the second injection; and third injection of fuel into a cylinder, the third injection taking place after an ignition point in time of a compression stroke of the second working cycle of the second cylinder.

The second injection may remove the remaining excess oxygen present in the catalytic converter. The fuel quantity of the second injection may result in a substoichiometric ($\lambda<1$) engine operation or in a stoichiometric ($\lambda=1$) engine operation.

The oxygen storage surface of the catalytic converter may be preconditioned by the third injection (postinjection), so that raw nitrogen oxide emissions generated during the recombustion phase in the following working cycle may be converted. The subsequent substoichiometric ($\lambda<1$) phases of the fuel feed restart and the emptying of the catalytic converter may be less pronounced, so that the hydrocarbon components (HC) and carbon monoxide (CO) emissions and the carbon dioxide ($CO_2$) consumption may be reduced. In addition, a combustion in the following working cycle may be carried out with a stoichiometric ($\lambda=1$) engine operation, which would possibly result in fuel savings.

The reduction method may further comprise: ascertaining the oxygen content in an oxygen store of the catalytic converter; ascertaining a preinjection fuel quantity, based on the oxygen content of the oxygen store; and ascertaining the fuel quantity of the fuel of the first injection, based on the ascertained preinjection fuel quantity.

The preinjection fuel quantity may be dependent on the stored oxygen quantity. This may be fundamentally ascertained via the catalytic converter diagnosis (aging) and may be used for a complete oxygen load of the catalytic converter to calculate a fuel quantity. If the oxygen load is not available (not in overrun fuel cutoff mode long enough or no oxygen measurement running), the fuel quantity may be ascertained from a model via the through-flow air during the overrun fuel cutoff.

The preinjection fuel quantity may be calculated internally via the stoichiometric ratio of the air quantity integral starting at the entry into overrun fuel cutoff mode. Alternatively, the preinjection fuel quantity may be ascertained based on a throughput fuel quantity after a fuel feed restart up to a defined signal value of a secondary lambda sensor. A further alternative may involve ascertaining the preinjection fuel quantity based on a theoretically throughput fuel quantity via the stoichiometric ratio after the entry into overrun fuel cutoff mode up to a defined signal value of the secondary lambda sensor. In some specific embodiments, the reduction method may further comprise: ascertaining a fuel mass integral based on the fuel quantity of the first injection and the second injection; and/or ascertaining whether an abort condition for the reduction method is present, the abort condition being present when the fuel mass integral reaches the preinjection fuel quantity.

The reduction method runs within the time window of the recombustion until the optimum conversion of oxygen in the catalytic converter is reached.

The fuel quantity of the fuel of the second injection may be greater than the fuel needed for a complete combustion of the fuel.

The excess fuel quantity of the second injection results in a rich air/fuel mixture ($\lambda<1$), the excess fuel quantity may be supplied to the catalytic converter uncombusted to remove the remaining excess oxygen in the catalytic converter.

The fuel quantity of the fuel of the second injection may correspond to a fuel quantity for a complete combustion of the fuel.

The optimal fuel quantity for the complete combustion of the second injection may result in fuel savings.

A second aspect relates to an engine arrangement comprising an engine control unit, which is configured to carry out a method according to one of the preceding examples.

A third aspect relates to a vehicle, including the preceding engine arrangement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
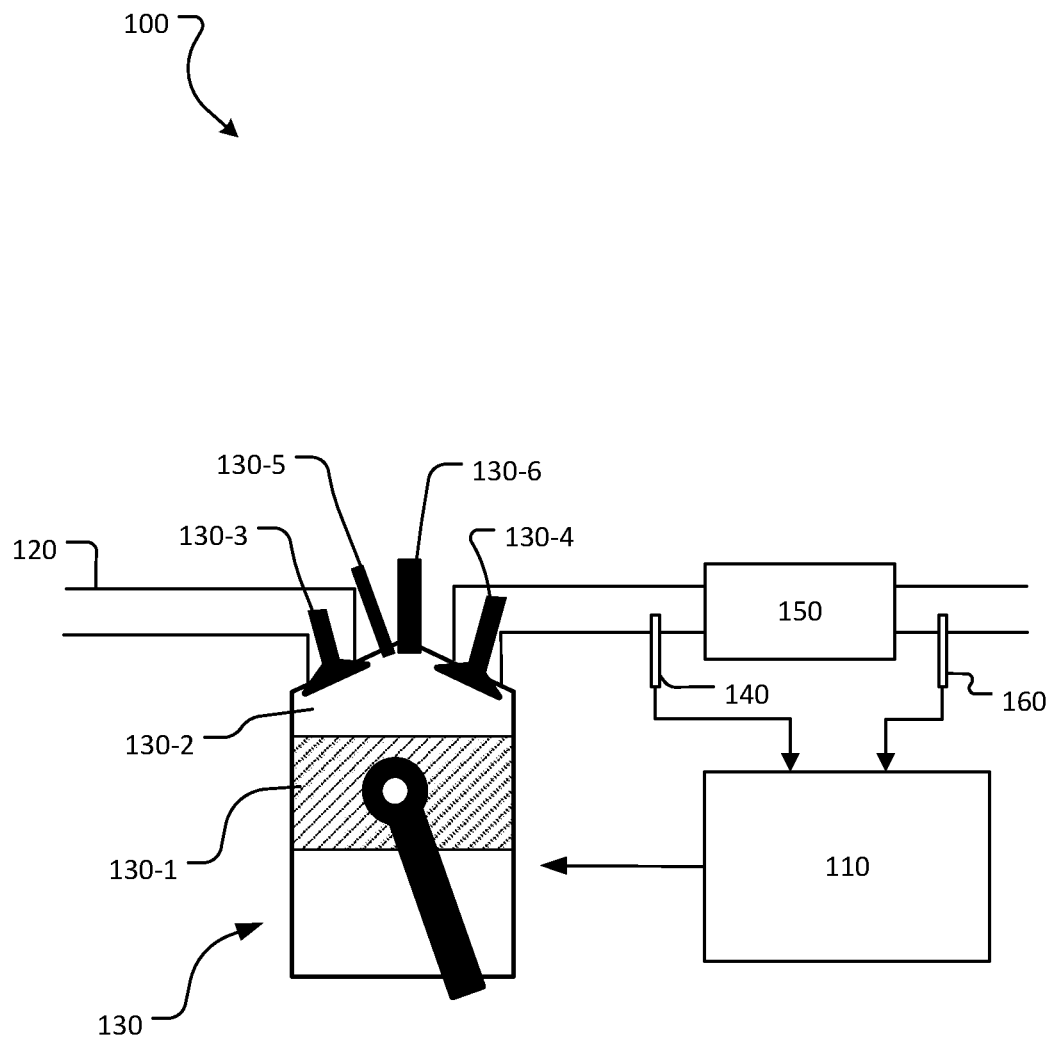
FIG. 1 schematically shows an exemplary embodiment of a vehicle, including an internal combustion engine.

FIG. 1 schematically shows an exemplary embodiment of a vehicle, including an internal combustion engine. Vehicle 100 comprises an engine control unit 110, an internal combustion engine 130 and a catalytic converter 150.

Internal combustion engine 130 may be an SI engine, which is driven by the combustion of a fuel/air mixture. Internal combustion engine 130 comprises a piston 130-1, a cylinder 130-2, an intake valve 130-3, an exhaust valve 130-4, a fuel injector 130-5 and a spark plug 130-6. The energy conversion takes place according to either the four stroke or two stroke principle. A four stroke principle internal combustion engine has four working strokes: induction stroke, compression stroke, power stroke and exhaust stroke. Internal combustion engine 130 may comprise 2 to 16 cylinders.

Engine control unit 110 controls/regulates the opening/closing of valves 130-3, 130-4 at a precisely defined point in time, so that the desired power and torque requirements in the particular operating states are met, and fuel consumption and harmful emissions are kept as low as possible. Engine control unit 110 further controls/regulates the injection quantity and injection timing point of the fuel.

In the induction stroke, piston 130-1 is initially at the top dead center of cylinder 130-2, and intake valve 130-3 is in the open state and exhaust valve 130-4 is in the closed state. The fuel/air mixture is sucked in through intake valve 130-3 in that piston 130-1 is moved downward.

In the compression stroke, intake valve 130-3 and exhaust valve 130-4 are closed. Fuel injector 130-5 injects fuel directly into cylinder 130-2. A fuel/air mixture is generated thereby in cylinder 130-2. This fuel/air mixture is compressed in that piston 130-1 is guided to the top dead center of cylinder 130-2. Shortly before the top dead center, spark plug 130-6 ignites the compressed fuel/air mixture.

In the power stroke, piston 130-1 is pressed downward explosively, and the valves (intake valve 130-3 and exhaust valve 130-4) remain closed. During the combustion of fuel with air oxygen, hydrogen ($H_2O$) and carbon dioxide ($CO_2$) are generated in cylinder 130-2. However, since the combustion process is not fully completed, further combustion products are generated, which are referred to as exhaust gas. The exhaust gas of SI engines contains carbon monoxide (CO), hydrocarbons (HC) and nitrogen oxides (NOx).

In the exhaust stroke, exhaust valve 130-4 is opened, and piston 130-1 is moved upward, so that the exhaust gases may be conducted to catalytic converter 150. Catalytic converter 150 is used to convert the exhaust gases generated during combustion into water ($H_2O$) and carbon dioxide ($CO_2$).

A lambda sensor 140 is situated between exhaust valve 130-4 and catalytic converter 150. The lambda sensor 140 compares the residual oxygen content in the exhaust gas with the oxygen content of a reference, generally the current atmospheric air. The lambda value (ratio of combustion air to fuel) may be ascertained therefrom and thus set. Lambda value $\lambda$ correlates the necessary air quantity with the theoretical air requirement. $\lambda=1$ thus indicates the optimal air quantity for a complete combustion of the mixture. In the mixture preparation of internal combustion engine 130, a distinction is made between "rich mixture (substoichiometric) ($\lambda<1$)" and "lean mixture ($\lambda>1$)". Since the mixture becomes increasingly richer ($\lambda<1$), the relative oxygen deficiency in the combustion results in that the share of carbon monoxide and hydrocarbon increases. In a lean mixture ($\lambda>1$), the oxygen content in the exhaust gas is relatively high. Depending on the degree of depletion, the formation of carbon monoxide (CO) and hydrocarbons (HC) in the exhaust gas is prevented, but the very high combustion temperatures which result lead to an increased formation of climate-damaging nitrogen oxides (NOx).

Catalytic converter 150 includes a high-grade steel housing. A metallic (Metalith) or ceramic (Monolith) oxygen store is installed in this high-grade steel housing. Many small channels pass through the oxygen store in the longitudinal direction. The largest possible surface is created thereby to achieve an optimal effect of the catalytic converter. The carrier surface is provided with a highly porous layer (washcoat). Noble metals (platinum, palladium and/or rhodium) are embedded into this layer. Catalytic converter 150 may be a three-way catalytic converter or a four-way catalytic converter.

A second lambda sensor (secondary lambda sensor) 160 is situated behind catalytic converter 150. Due to the high oxygen storage capacity of catalytic converter 150, very little residual oxygen remains in the exhaust gas downstream from the catalytic converter. First lambda sensor 140 therefore indicates abrupt voltage changes, while secondary lambda sensor 160 indicates nearly constant voltage. As the catalytic converter ages, the capacity of the oxygen storage system also decreases, which reduces the damping of oxygen fluctuations. This process may be measured based on secondary lambda sensor 160 to determine the aging of catalytic converter 150.

Under certain circumstances, e.g. downhill travel, internal combustion engine 130 may not need to supply power. In a case of this type, one speaks of the fact that the vehicle is in overrun fuel cutoff mode. In overrun fuel cutoff mode, the supply of fuel may be interrupted, which is referred to as overrun fuel cutoff. During overrun fuel cutoff, fresh air is supplied to catalytic converter 150 instead of exhaust gas. After filling the oxygen store by means of overrun fuel cutoff, catalytic converter 150 may be unable to convert nitrogen oxides (NOx) for a short period of time after restarting the fuel feed. Since a combustion may not run ideally, nitrogen oxide (NOx) raw emissions within a certain range are to be measured even during substoichiometric engine operation. This behavior is supported by the unsteady state change between overrun fuel cutoff (pure oxygen ($O_2$) transport, lower cylinder temperatures) and the first combustions during fuel feed restart. By combining the individual cylinders in the exhaust system and the pressure pulses situated there, the first raw emissions of the initially combusting cylinders is mixed with the air still present in the exhaust system. As a result, the nitrogen oxide (NOx) components of the raw emissions are unable or only partially able to be converted in the catalytic converter, since the latter is completely filled with oxygen from the overrun fuel cutoff mode. To improve the conversion properties of catalytic converter 150 with regard to the nitrogen oxide emissions (NOx), a reduction method is provided for optimizing the oxygen content of catalytic converter 150. In the reduction method, the oxygen content of catalytic converter 150 is reduced by a preinjection following the overrun fuel cutoff/stop phase. A more detailed explanation of the reduction method may be found in FIG. 2 below.

Figure 2:
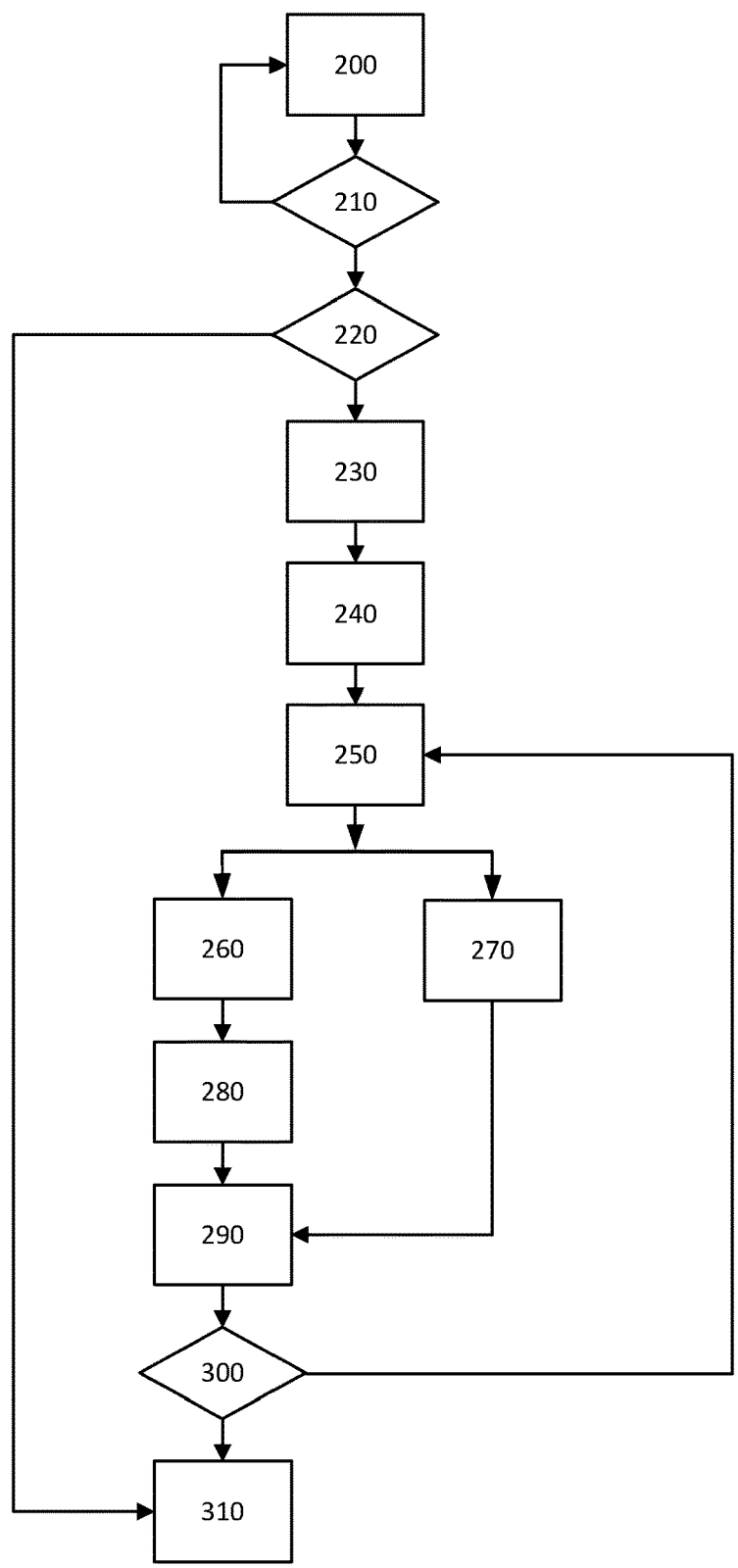
FIG. 2 shows, as an exemplary embodiment, a block diagram for a reduction method for optimizing the oxygen content of a catalytic converter.

FIG. 2 shows, as an exemplary embodiment, a block diagram for a reduction method for optimizing the oxygen content of a catalytic converter.

In step 200, it is ascertained that internal combustion engine (130 in FIG. 1) is in overrun fuel cutoff mode.

In step 210, it is ascertained whether the engine is leaving overrun fuel cutoff mode. The ascertainment of the ending of overrun fuel cutoff mode may take place by the driver himself, by driver assistance systems or by internal requirements in the engine control unit (110 in FIG. 1). For example, the ending of overrun fuel cutoff mode may be determined when the engine rotational speed of the internal combustion engine (130 in FIG. 1) is below a predefined minimum rotational speed. The ending of overrun fuel cutoff mode may also be determined when the temperature of the catalytic converter (150 in FIG. 1) is below a predefined minimum temperature. If it is established that the overrun fuel cutoff mode has ended, the reduction method continues with step 220, otherwise the reduction method returns to step 200.

In step 220, it is ascertained whether the oxygen store of the catalytic converter (150 in FIG. 1) is filled. The oxygen store of the catalytic converter is considered to be filled if either the secondary lambda sensor (160 in FIG. 1) is designed as a bistable sensor, drops below a voltage threshold or has a voltage or lambda gradient which represents the "lean breakthrough." If it is established that the oxygen store of the catalytic converter is not filled, the reduction method is aborted (step 300) and the internal combustion engine (130 in FIG. 1) carries out combustion with a stoichiometric ($\lambda=1$) combustion air ratio. In other words, the fuel quantity injected into the cylinder (130-2 in FIG. 1) during the compression stroke corresponds to the fuel quantity which is necessary for the complete combustion of the fuel. If it is established that the oxygen store of the catalytic converter is filled, the reduction method continues with step 230.

In step 230, the cylinder which is suitable for the recombustion of the internal combustion engine (130 in FIG. 1) is ascertained. The ascertainment may be based on the current power stroke of the particular cylinder. For example, the cylinders which are in the exhaust stroke may be selected for the recombustion of the internal combustion engine (130 in FIG. 1).

In step 240, the cylinder at which the first preinjection is to take place is ascertained. The ascertainment of the cylinder in which the first preinjection takes place may be based on a time interval and a threshold value, the time interval being of the time range between the point in time at which it is established that the overrun fuel cutoff mode has ended and the injection point in time of the cylinder selected in step 230. If the time interval is smaller than the threshold value, the cylinder selected in step 230 is selected for the first preinjection. If the time interval is larger than the threshold value, the cylinder of the next ignition sequence is selected, in which the first preinjection takes place (cf. FIG. 3 or FIG. 4).

In step 250, the oxygen fill level of the catalytic converter (150 in FIG. 1) is ascertained. To ascertain the oxygen fill level of the catalytic converter, the mass flow is first ascertained, which flows through the internal combustion engine (130 in FIG. 1) into the catalytic converter (150 in FIG. 1) in overrun fuel cutoff mode. Alternatively, the mass flow may also be ascertained from the different sensors (pressure sensors, hot film air mass meter) and the models known to those skilled in the art (e.g., based on parameters of the throttle valve, the camshafts and/or the turbocharger rotational speed). Based on the usual oxygen component ($O_2$) in the breathable air and that of the ascertained mass flow, the oxygen component ($O_2$) stored in the catalytic converter by the particular overrun fuel cutoff mode may be ascertained. The oxygen components ($O_2$) stored by the particular overrun fuel cutoff mode are integrated over time, and the total oxygen component (oxygen fill level) of the catalytic converter (150 in FIG. 1) is ascertained.

In step 260, the preinjection fuel quantity of the fuel (preinjection fuel) for emptying the oxygen store of the catalytic converter (150 in FIG. 1) is ascertained, which is needed to reduce the oxygen in the catalytic converter completely or only by a defined quantity. The preinjection fuel quantity necessary for emptying may be approximately calculated based on the oxygen fill level of the catalytic converter (150 in FIG. 1) ascertained in step 250 via the stoichiometric ratio of the particular injected fuel with additional corrections (e.g., load/rotational speed/catalytic converter properties (OSC/RSC)). The preinjection fuel quantity may be limited by means of the current oxygen component (02) of the catalytic converter.

In step 270, the fuel quantity is ascertained for the combustion in the power stroke of the internal combustion engine (130 in FIG. 1) for emptying the oxygen store of the catalytic converter (150 in FIG. 1). The fuel quantity injected into the cylinder during the power stroke may be determined in such a way that the compression air ratio is substoichiometric ($\lambda<1$). In other words, the fuel quantity injected into the cylinder during the power stroke may be greater than the fuel quantity necessary for the complete combustion of the fuel (cf. FIG. 5). Alternatively, the fuel quantity injected into the cylinder during the power stroke may be determined in such a way that the compression air ratio is stoichiometric ($\lambda=1$). In other words, the fuel quantity injected into the cylinder during the power stroke corresponds to the fuel quantity necessary for the complete combustion of the fuel (cf. FIG. 6).

In step 280, a preinjection fuel is injected, based on the preinjection fuel quantity ascertained in step 260, in the exhaust stroke of the cylinder which was selected in step 230. Alternatively, the preinjection fuel may be injected in the power stroke, based on the preinjection fuel quantity ascertained in step 260, so that the subsequently injected preinjection fuel remains uncombusted. In this way, the stored oxygen quantity in the oxygen store may be reduced completely or only by the minimal oxygen quantity, which results due to the reduction of the nitrogen oxide (NOx) components of the combusting internal combustion engine (130 in FIG. 1). The injection quantity of the preinjection fuel necessary in the particular exhaust stroke or power stroke may be predefined or determined, based on the preinjection fuel quantity ascertained in step 260.

In step 290, the fuel is injected based on the fuel quantity ascertained in step 260, which contributes to the combustion in the particular cylinder. Specifically, this means that fuel is injected and ignited in the compression stroke, based on the fuel quantity ascertained in step 260.

In step 300, it is ascertained whether a fuel mass integral has exceeded (reached) the preinjection fuel quantity ascertained in step 230. The fuel mass integral may be ascertained from the fuel throughput of the preinjection, proportionately via the injection distribution of fresh air and setpoint lambda as well as exhaust gas mass flow. If it is established that the fuel mass integral has exceeded the preinjection fuel quantity, the preinjection is ended. The fuel injection may also be ended when the secondary lambda sensor (160 in FIG. 1) has a voltage or lambda gradient which is above a predetermined limit value, which points to a sufficiently reduced oxygen mass in the catalytic converter. The fuel mass integral may be ascertained with the oxygen storage capacity (OSC) from, e.g., the catalytic converter diagnosis and corrected or limited depending on the operating point. If it is established that the preinjection is to be ended, the reduction method continues with step 300, otherwise the process returns to step 240.

Figure 5:
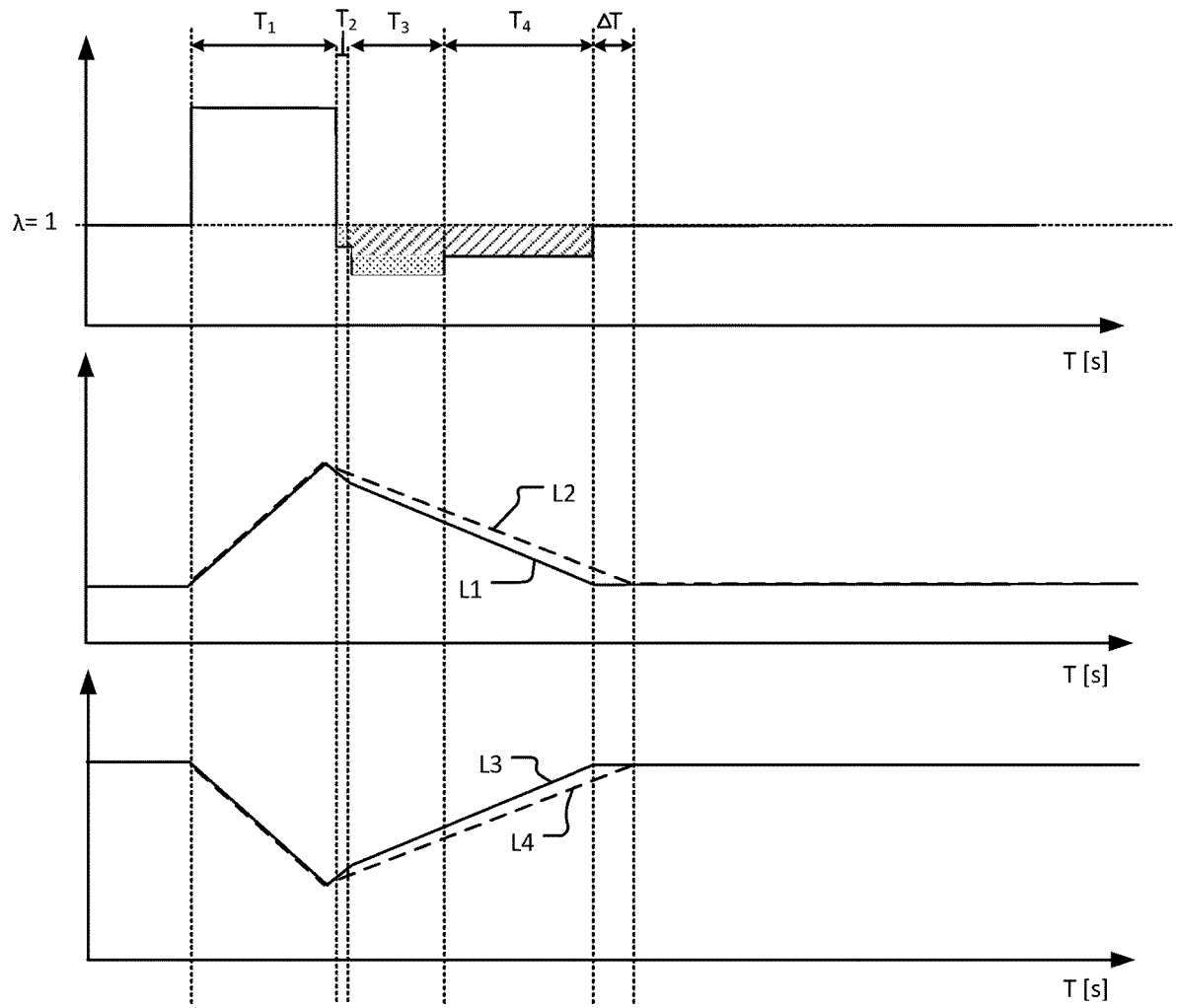
FIG. 5 shows, as an exemplary embodiment, a combustion air ratio ($\lambda$) over time, the oxygen storage quantity in the catalytic converter over time and the efficiency of the nitrogen oxide (NOx) conversion in the catalytic converter over time.
Figure 6:
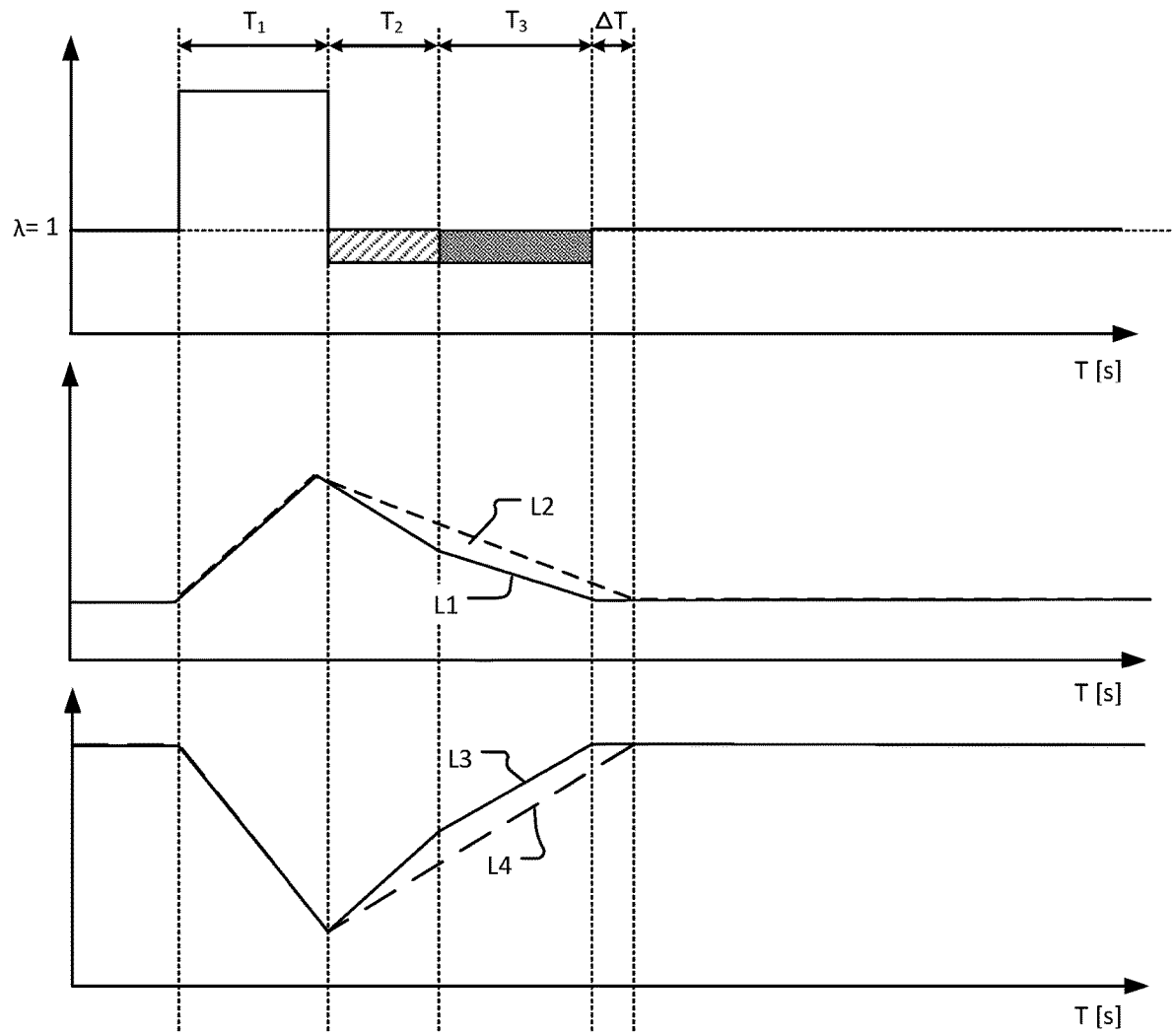
FIG. 6 shows, as an exemplary embodiment, a combustion air ratio ($\lambda$) over time, the oxygen storage quantity in the catalytic converter over time and the efficiency of the nitrogen oxide (NOx) conversion in the catalytic converter over time.

In step 310, the reduction method is aborted, and the internal combustion engine (130 in FIG. 1) is operated with a substoichiometric ($\lambda<1$) combustion air ratio up to a predetermined time (cf. FIG. 5 or FIG. 6). Alternatively, this step may be skipped, and the internal combustion engine (130 in FIG. 1) may be operated with a stoichiometric ($\lambda=1$) combustion ratio after aborting the reduction method (cf. FIG. 7).

The necessary preinjection fuel quantity may be ascertained after each working cycle (upon returning to step 240 after step 290) of the particular cylinder by adapting the injected fuel quantity, based on the signal characteristic of the voltage of the secondary lambda sensor (160 in FIG. 1). Alternatively or additionally, it is possible to calculate a theoretically supplied preinjection fuel quantity upon entering the overrun fuel cutoff mode up to a defined signal characteristic of the voltage of the secondary lambda sensor. In addition, the fuel quantity necessary for the preinjection may be determined by using a ratio formation between the oxygen storage capacity (OSC) of the catalytic converter and the reduction storage capacity (RSC) of the catalytic converter. This ratio formation is a measure of the oxygen removal and may differ from the OSC value due to chemical influences. The necessary excess quantity of the fuel in step 260 may be taken into account during the determination of the preinjection fuel quantity (step 230). This means that the preinjection fuel quantity may be reduced by taking into account the excess quantity of the fuel in step 260. It should be noted that the raw air in the cylinder must also be taken into account for an uncombusted supply of the fuel. The combination with a very early preinjection is useful at low rotational speeds and this great delay times.

Figure 3:
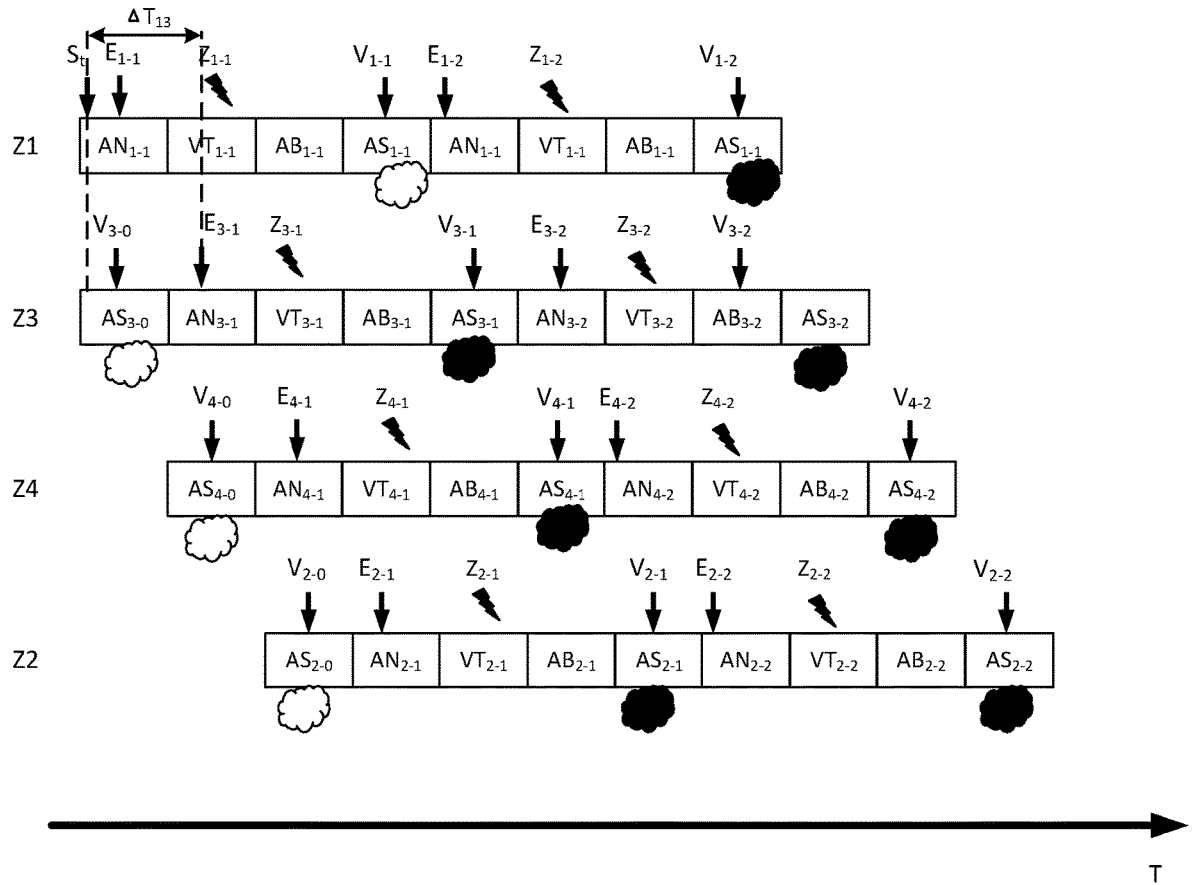
FIG. 3 shows, as an exemplary embodiment, a time sequence of a fuel feed restart of fuel in a four-stroke, four-cylinder internal combustion engine after an overrun fuel cutoff mode with preinjection.

FIG. 3 shows, as an exemplary embodiment, a time sequence of a fuel feed restart of fuel in a four-stroke, four-cylinder internal combustion engine after an overrun fuel cutoff mode with preinjection. FIG. 3 shows a four-stroke, four-cylinder internal combustion engine (130 in FIG. 1) having ignition sequence 1-3-4-2; alternatively, the four-strike, four-cylinder internal combustion engine may have an ignition sequence of 1-2-4-3. The first row of FIG. 3 shows two working cycles of first cylinder Z1, the second row of FIG. 3 shows two working cycles of third cylinder Z3, the third row of FIG. 3 shows two working cycles of fourth cylinder Z4, and the fourth row of FIG. 3 shows two working cycles of second cylinder Z2. Each working cycle (combustion cycle) comprises four work steps: induction stroke (AN), compression stroke (VT), power stroke (AB) and exhaust stroke (AS). At point in time $S_t$, it is ascertained that the engine leaves (ends) an overrun fuel cutoff mode (step S210 in FIG. 2). At point in time $S_t$, cylinder Z1 is in induction stroke $AN_{1-1}$ and cylinder Z3 is in exhaust stroke $AS_{3-0}$. Cylinder Z3 is therefore selected for the recombustion of internal combustion engine (step S230 in FIG. 2). Since time interval $\Delta T_{13}$ between point in time $S_t$ and injection point in time $E_{3-1}$ of cylinder Z3 is greater than a threshold value, cylinder Z3 is selected, in that the first preinjection takes place (step S240 in FIG. 2). First preinjection $V_{3-0}$ thus takes place, which is injected in exhaust stroke $AS_{3-0}$ of third cylinder Z3, third cylinder Z3 sill being in overrun fuel cutoff mode, and no combustion having yet taken place in this cylinder Z3. An injection of fuel, which contributes to the combustion in third cylinder Z3, takes place at injection point in time $E_{3-1}$. The injected fuel is ignited at ignition point in time $Z_{3-1}$, and a second preinjection $V_{3-1}$ takes place in following exhaust stroke $AS_{3-1}$. The first combusted raw emissions arrive in the catalytic converter (150 in FIG. 1) in exhaust stroke $AS_{3-1}$. $E_{1-1}$ shows a theoretical injection point in time in overrun fuel cutoff mode, no fuel introduction taking place. $Z_{1-1}$ shows a theoretical ignition point in time of first cylinder Z1, no ignition taking place. After first ignition point in time $Z_{1-1}$ of first cylinder Z1, a preinjection $V_{1-1}$ takes place, which is reduced in exhaust stroke $AS_{1-1}$ of the first working cycle. In exhaust strokes $AS_{4-0}$ and $AS_{2-0}$ of particular cylinder Z2, Z4, two further preinjections $V_{4-0}$, $V_{2-0}$ take place prior to injection point in times $E_{4-1}$ and $E_{2-1}$. Due to preinjections $V_{1-1}$, $V_{3-0}$, $V_{4-0}$ and $V_{2-0}$, uncombusted hydrocarbons (HC) reach the catalytic converter and react with the stored oxygen before the combusted raw emissions reach the catalytic converter. An injection of fuel, which contributes to the combustion in third cylinder Z3, takes place at injection point in time $E_{4-1}$. The injected fuel is ignited at ignition point in time $Z_{4-1}$, and a second preinjection $V_{4-1}$ takes place in following exhaust stroke $AS_{4-1}$. An injection of fuel, which contributes to the combustion in second cylinder Z2, takes place at injection point in time $E_{2-1}$. The injected fuel is ignited at ignition point in time $Z_{2-1}$, and a second preinjection $V_{2-1}$ takes place in following exhaust stroke $AS_{2-1}$. An injection of fuel takes place at each of injection point in times $E_{1-2}$, $E_{2-2}$, $E_{3-2}$, $E_{4-2}$ of the second working cycle, which contributes to the combustion in the particular cylinder, and the injected fuel is ignited at ignition point in time $Z_{1-2}$, $Z_{2-2}$, $Z_{3-2}$, $Z_{4-2}$ of the second working cycle. A third preinjection $V_{1-2}$, $V_{2-2}$, $V_{3-2}$, $V_{4-2}$ takes place in the exhaust stroke of the second working cycle of each cylinder. The working cycle having the preinjection continues to take place until an abort condition of the reduction method (FIG. 2) is present. FIG. 3 shows a preinjection in the exhaust stroke; alternatively, the preinjections may take place in the power stroke.

Figure 4:
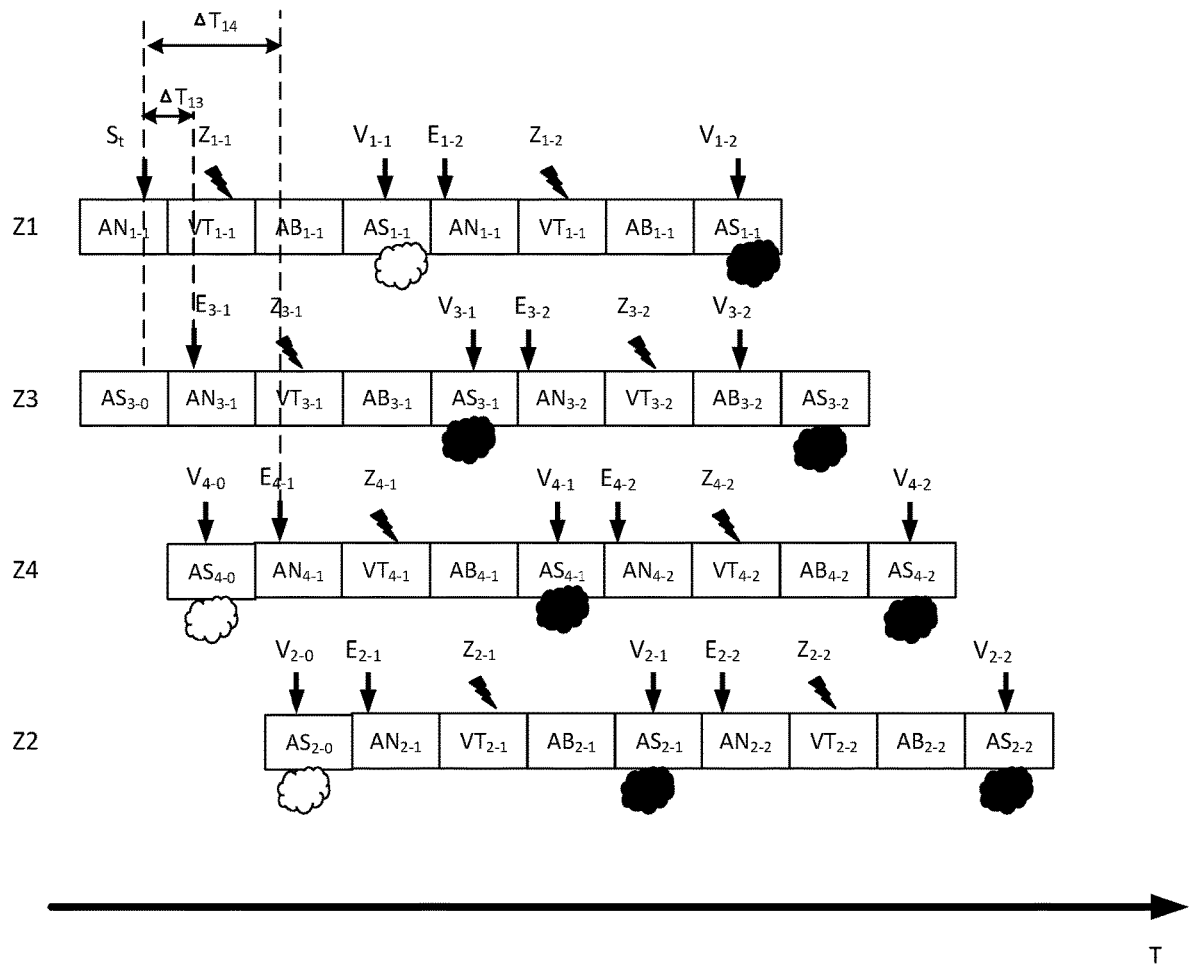
FIG. 4 shows, as an exemplary embodiment, a time sequence of a fuel feed restart of fuel in a four-stroke, four-cylinder internal combustion engine after an overrun fuel cutoff mode with preinjection.

FIG. 4 shows, as a further exemplary embodiment, a time sequence of a fuel feed restart of fuel in a four-stroke, four-cylinder internal combustion engine after a overrun fuel cutoff mode with preinjection. FIG. 4 differs from FIG. 3 in that no preinjection ($V_{3-0}$ in FIG. 3) takes place, which is reduced in exhaust stroke $AS_{3-0}$ of third cylinder Z3, third cylinder Z3 sill being in overrun fuel cutoff mode, and no combustion having yet taken place in this cylinder Z3. Since time interval $\Delta T_{13}$ is less than a threshold value, cylinder Z4 is selected, in which the first preinjection takes place (step S240 in FIG. 2). The uncombusted hydrocarbons (HC), which are present due to preinjections $V_{1-1}$, $V_{4-0}$ and $V_{2-0}$, react with the oxygen stored in the catalytic converter (150 in FIG. 1) before the first combustion, the combustion of the fuel by ignition in the third cylinder Z3, takes place.

FIG. 5 shows, as an exemplary embodiment, a combustion air ratio ($\lambda$) over time, the oxygen storage quantity in the catalytic converter over time and the efficiency of the nitrogen oxide (NOx) conversion in the catalytic converter over time. The top function graph in FIG. 5 represents the combustion air ratio ($\lambda$), the X axis representing the time in seconds and the Y axis representing the combustion ratio ($\lambda$). The dashed line drawn horizontally along the time axis represents the stoichiometric combustion ratio ($\lambda=1$). The middle function graph in FIG. 5 represents the oxygen storage quantity in the catalytic converter, the X axis representing the time in seconds and the Y axis representing the oxygen storage quantity. Solid line L1 represents the oxygen quantity stored in the catalytic converter, the fuel being injected according to the reduction method in FIG. 2. Dashed line L2 represents the oxygen quantity stored in the catalytic converter, with which the fuel is injected with a conventional injection method. In the conventional injection method, no preinjection takes place, but only a rich fuel injection in the induction stroke. The bottom function graph in FIG. 5 represents the efficiently of the nitrogen oxide (NOx) conversion in the catalytic converter, the X axis representing the time in seconds and the Y axis representing the efficiency of the nitrogen oxide (NOx) conversion. Solid line L3 represents the efficiency of the nitrogen oxide (NOx) conversion, the fuel being injected according to the reduction method in FIG. 2. Dashed line L4 represents the efficiency of the nitrogen oxide (NOx) conversion, at which the fuel is injected with a conventional injection method.

The internal combustion engine (130 in FIG. 1) is in overrun fuel cutoff mode at point in time $T_1$. Since no combustion is necessary in overrun fuel cutoff mode, the generated exhaust gas becomes increasingly leaner after each working cycle (induction stroke, compression stroke, power stroke and exhaust stroke), and the combustion air ratio ($\lambda$) thus also increases. This results in more oxygen ($O_2$) being transferred to the catalytic converter (150 in FIG. 1). As a result, the oxygen storage quantity in the catalytic converter also increases in overrun fuel cutoff mode (point in time $T_1$). Due to the excess oxygen in the catalytic converter, the efficiency of the nitrogen oxide (NOx) conversion in the catalytic converter deteriorates in overrun fuel cutoff mode (point in time $T_1$).

It is established at point in time $T_2$ that the overrun fuel cutoff mode has ended and the internal combustion engine (130 in FIG. 1) is operating again. At point in time $T_2$, a first fuel quantity ($V_{1-1}$, $V_{3-0}$, $V_{4-0}$, $V_{2-0}$ in FIG. 3; $V_{1-1}$, $V_{4-0}$, $V_{2-0}$ in FIG. 4) is injected in the cylinder (130-2 in FIG. 1) after the ignition point in time of the power stroke or in the exhaust stroke. This first injected fuel quantity is transferred to the catalytic converter. The uncombusted hydrocarbons (HC) of the first injection consume the oxygen quantity stored in the catalytic converter and are converted into carbon dioxide ($CO_2$) and water vapor ($H_2O$). The oxygen quantity stored in the catalytic converter is reduced thereby. The reduction of the oxygen in the catalytic converter results in an improvement in the efficiency of the nitrogen oxide (NOx) conversion in the catalytic converter.

At point in time $T_3$, a second fuel quantity is injected into the cylinder, and the second fuel quantity (for example, $E_{3-1}$ in FIG. 3) is ignited. After the ignition of the second injection, a third injection ($V_{1-2}$, $V_{3-1}$, $V_{4-1}$, $V_{2-1}$ in FIG. 3; $V_{1-2}$, $V_{4-1}$, $V_{2-1}$ in FIG. 4) is carried out, the third injection taking place after the ignition point in time of the power stroke or in the exhaust stroke. The fuel quantity of the second injection may be greater than the fuel needed for a complete combustion of the fuel. The gas mixture of the exhaust gas at point in time $T_3$ is therefore richer than the gas mixture at point in time $T_2$. Due to the richer gas mixture of the exhaust gas at point in time $T_3$, the oxygen quantity stored in the catalytic converter is further reduced, and the efficiency of the nitrogen oxide (NOx) conversion is further improved.

No preinjection takes place at point in time $T_4$. In other words, no further fuel is injected into the cylinder after igniting a fuel in the power stroke. The fuel quantity necessary for the power stroke is greater at point in time $T_3$ that the fuel quantity necessary for the complete combustion of the fuel. This fuel quantity, which results in a rich exhaust gas, continues to be present until the catalytic converter is emptied. Period of time $\Delta T$, illustrated in FIG. 5, shows the period of time between the time needed to empty the catalytic converter by the reduction method (FIG. 2) and the time needed to empty the catalytic converter by the conventional injection method. Since the reduction method (FIG. 2) requires less time to remove the oxygen from the catalytic converter, compared to the conventional injection method, fuel may contribute to an improvement of the NOx efficiency, due to the reduction method.

FIG. 6 shows, as a second exemplary embodiment, a combustion air ratio ($\lambda$) over time, the oxygen storage quantity in the catalytic converter over time and the efficiency of the nitrogen oxide (NOx) conversion in the catalytic converter over time. FIG. 6 differs from FIG. 5 in that the fuel quantity injected at point in time $T_2$ in FIG. 5 corresponds to a fuel quantity for the complete combustion of the fuel, and the fuel quantity for preinjection at points in time $T_2$ and $T_3$ results in a rich exhaust gas. No preinjection takes place any longer during point in time $T_3$, but rather this is a combination of preinjection ($T_2$) resulting in a rich air/fuel mixture (the normal combustion takes place at $\lambda=1$), and the conventional emptying of the catalytic converter takes place at point in time $T_3$. Compared to FIG. 5, the difference of $\Delta T$ now results in fuel savings over the conventional emptying of the catalytic converter.

Figure 7:
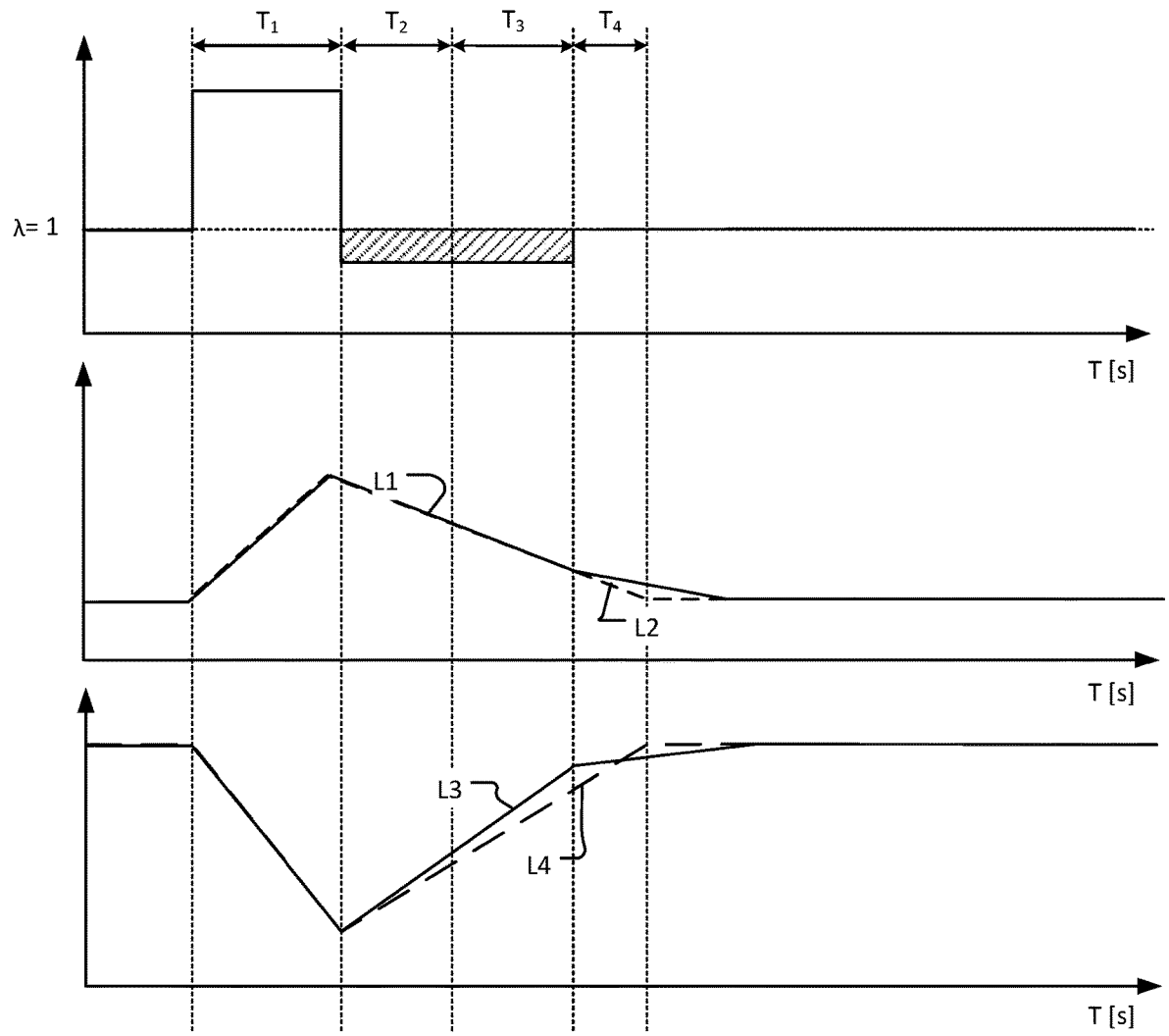
FIG. 7 shows, as an exemplary embodiment, a combustion air ratio ($\lambda$) over time, the oxygen storage quantity in the catalytic converter over time and the efficiency of the nitrogen oxide (NOx) conversion in the catalytic converter over time.

FIG. 7 shows, as a third exemplary embodiment, a combustion air ratio ($\lambda$) over time, the oxygen storage quantity in the catalytic converter over time and the efficiency of the nitrogen oxide (NOx) conversion in the catalytic converter over time. FIG. 7 differs from FIG. 5 in that the fuel quantity injected at point in time $T_2$ in FIG. 5 corresponds to a fuel quantity for the complete combustion of the fuel, and the fuel quantity for preinjection at points in time $T_2$ and $T_3$ results in a rich exhaust gas. FIG. 7 further differs from FIG. 5 in that the internal combustion engine is operated below a stoichiometric ($\lambda=1$) combustion air ratio after the preinjection. Point in time $T_4$ represents a time savings in removing the oxygen from the catalytic converter, whereby a consumption advantage should occur in computational terms.

Figure 8:
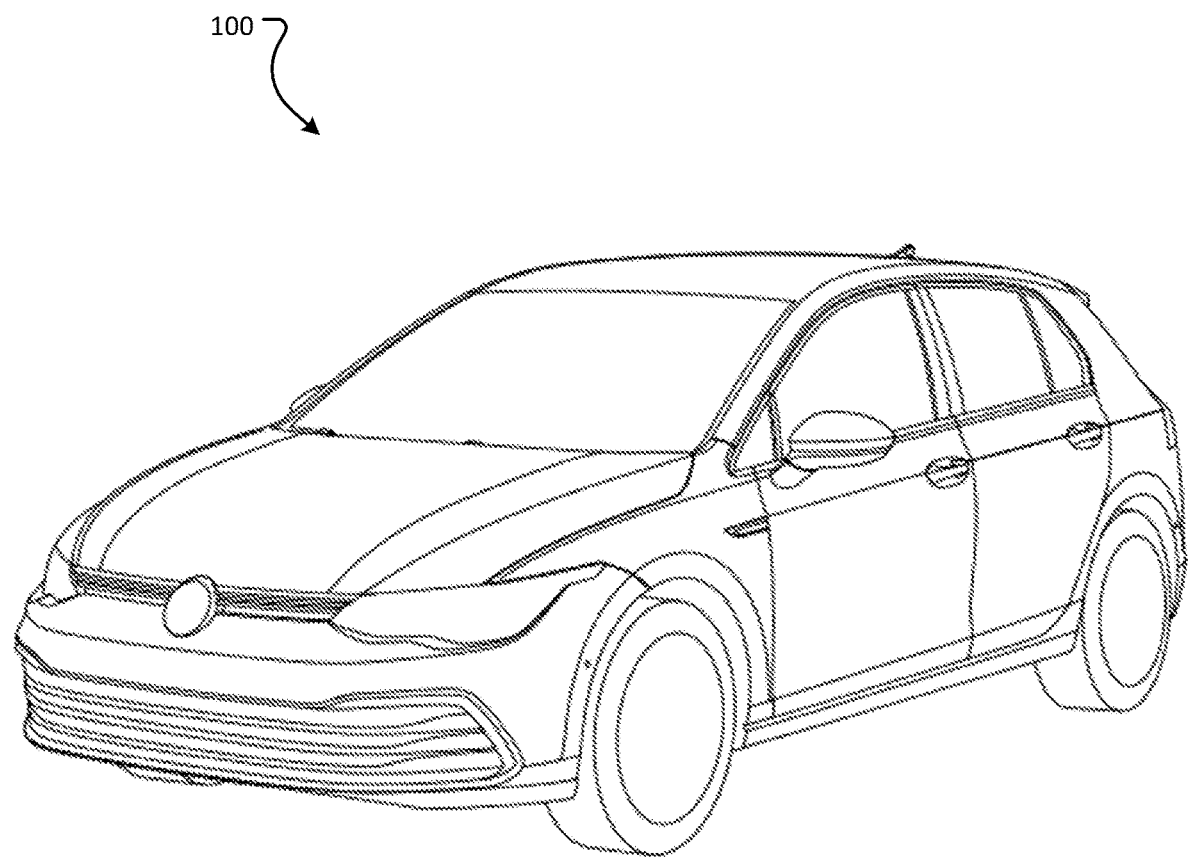
FIG. 8 shows, as an exemplary embodiment, a vehicle, including an engine arrangement.

FIG. 8 shows, as an exemplary embodiment, a vehicle, including an engine arrangement. The engine arrangement comprises an engine control unit (110 in FIG. 1), an internal combustion engine (130 in FIG. 1) and a catalytic converter (150 in FIG. 1). The engine arrangement is designed to carry out the reduction method according to FIG. 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A reduction method for a catalytic converter in an exhaust system of an internal combustion engine for reducing an oxygen content in the catalytic converter, the method comprising:
   performing a first injection of fuel into a first cylinder, the first injection taking place during an exhaust stroke of a first working cycle of the first cylinder which is after an ignition point in time of a compression stroke of the first working cycle of the first cylinder; and
   introducing the injected fuel from the first cylinder into the catalytic converter during the exhaust stroke of the first cylinder.

2. The reduction method according to claim 1, wherein no injection of fuel contributing to a combustion of the first cylinder takes place in the first working cycle.

3. The reduction method as recited in claim 1, further comprising:
   performing a second injection of fuel into a second cylinder, wherein the second injection takes place prior to an ignition point in time of a compression stroke of a second working cycle of the second cylinder;
   igniting the fuel of the second injection; and
   performing a third injection of fuel into the first cylinder, the third injection taking place after the ignition point in time of the compression stroke of the second working cycle of the second cylinder.

4. The reduction method according to claim 3, further comprising:
   ascertaining the oxygen content in an oxygen store of the catalytic converter;
   ascertaining a preinjection fuel quantity, based on the oxygen content of the oxygen store; and
   ascertaining a fuel quantity of the fuel of the first injection based on the ascertained preinjection fuel quantity.

5. The reduction method according to claim 4, further comprising:
   ascertaining a fuel mass integral based on the fuel quantity of the first injection and a fuel quantity of the second injection; and
   ascertaining whether an abort condition for the reduction method is present, the abort condition being present when the fuel mass integral reaches the ascertained preinjection fuel quantity.

6. The reduction method according to claim 3, wherein a fuel quantity of the fuel of the second injection is greater than a fuel needed for a complete combustion of the fuel.

7. The reduction method according to claim 3, wherein a fuel quantity of the fuel of the second injection corresponds to a fuel quantity needed for a complete combustion of the fuel.

8. An engine arrangement comprising an engine control unit configured to carry out the method according to claim 1.

9. A vehicle comprising the engine arrangement according to claim 8.

10. The method according to claim 1, wherein the reduction method reduces the oxygen content in the catalytic converter after an overrun fuel cutoff mode of the internal combustion engine.

* * * * *